United States Patent
Thelakkattu Devassy et al.

(10) Patent No.: US 12,199,313 B2
(45) Date of Patent: Jan. 14, 2025

(54) HERMETICALLY SEALED LITHIUM ION CELLS AND A METHOD FOR THEIR MANUFACTURE

(71) Applicant: INDIAN SPACE RESEARCH ORGANIZATION, Bangalore (IN)

(72) Inventors: Mercy Thelakkattu Devassy, Kerala (IN); Aravamuthan Srinivasan, Kerala (IN); Kamalakaran Kuruveettil Parukuttyamma, Kerala (IN); Kaladharan Vazhappallil Falgunan, Kerala (IN); John Bibin, Kerala (IN)

(73) Assignee: INDIAN SPACE RESEARCH ORGANIZATION, Bangalore (IN)

( * ) Notice: Subject to any disclaimer, the term of this patent is extended or adjusted under 35 U.S.C. 154(b) by 1109 days.

(21) Appl. No.: 16/980,404

(22) PCT Filed: Mar. 19, 2019

(86) PCT No.: PCT/IN2019/050224
§ 371 (c)(1),
(2) Date: Sep. 13, 2020

(87) PCT Pub. No.: WO2019/180740
PCT Pub. Date: Sep. 26, 2019

(65) Prior Publication Data
US 2021/0050579 A1    Feb. 18, 2021

(30) Foreign Application Priority Data

Mar. 20, 2018  (IN) .............................. 201841010148

(51) Int. Cl.
*H01M 10/0525* (2010.01)
*B23K 26/06* (2014.01)
(Continued)

(52) U.S. Cl.
CPC ....... *H01M 50/538* (2021.01); *B23K 26/0665* (2013.01); *B23K 26/1464* (2013.01);
(Continued)

(58) Field of Classification Search
CPC .... H01M 50/538; H01M 4/505; H01M 4/525; H01M 4/587; H01M 4/623;
(Continued)

(56) References Cited

U.S. PATENT DOCUMENTS 5,472,802 A * 12/1995 Holland .............. H01M 10/617
29/623.2
6,335,117 B1    1/2002 Yoshida et al.
(Continued)

FOREIGN PATENT DOCUMENTS

CN    103137917 A  *  6/2013  ............. Y02E 60/10
CN    205177898 U  *  4/2016  ............. Y02E 60/10
(Continued)

*Primary Examiner* — Kaity V Chandler
(74) *Attorney, Agent, or Firm* — Weber Rosselli & Cannon LLP

(57) ABSTRACT

The present application relates to a hermetically sealed higher capacity lithium ion cells for various applications including space, and a method for their manufacture. In particular, the present invention provides hermetically sealed lithium ion cells of higher capacity (40-100 Ah) with very high capacity retention capability.

15 Claims, 1 Drawing Sheet

(51) Int. Cl.
*B23K 26/14* (2014.01)
*B23K 26/32* (2014.01)
*H01M 4/505* (2010.01)
*H01M 4/525* (2010.01)
*H01M 4/587* (2010.01)
*H01M 4/62* (2006.01)
*H01M 10/0587* (2010.01)
*H01M 50/176* (2021.01)
*H01M 50/184* (2021.01)
*H01M 50/191* (2021.01)
*H01M 50/536* (2021.01)
*H01M 50/538* (2021.01)
*H01M 50/55* (2021.01)
*H01M 50/553* (2021.01)
*H01M 50/566* (2021.01)

(52) U.S. Cl.
CPC ............. *B23K 26/32* (2013.01); *H01M 4/505* (2013.01); *H01M 4/525* (2013.01); *H01M 4/587* (2013.01); *H01M 4/623* (2013.01); *H01M 10/0525* (2013.01); *H01M 10/0587* (2013.01); *H01M 50/176* (2021.01); *H01M 50/184* (2021.01); *H01M 50/191* (2021.01); *H01M 50/536* (2021.01); *H01M 50/55* (2021.01); *H01M 50/553* (2021.01); *H01M 50/566* (2021.01)

(58) Field of Classification Search
CPC ......... H01M 10/0525; H01M 10/0587; H01M 50/176; H01M 50/184; H01M 50/191; H01M 50/536; H01M 50/55; H01M 50/553; H01M 50/566; H01M 4/485; H01M 4/625; H01M 50/169; H01M 4/131; H01M 4/133; H01M 10/6551; H01M 10/6553; H01M 50/54; H01M 50/543; B23K 26/0665; B23K 26/1464; B23K 26/32; B23K 26/21; B23K 2101/38; Y02E 60/10; Y02P 70/50

See application file for complete search history.

(56) References Cited

U.S. PATENT DOCUMENTS

| | | | |
|---|---|---|---|
| 6,379,840 B2 | 4/2002 | Kitoh et al. | |
| 6,586,134 B2 | 7/2003 | Skoumpris | |
| 8,491,673 B2 | 7/2013 | Daidoji et al. | |
| 8,632,912 B2 | 1/2014 | Okamoto et al. | |
| 9,461,279 B2 | 10/2016 | Harayama et al. | |
| 9,620,747 B2 | 4/2017 | Kim et al. | |
| 2006/0096958 A1 | 5/2006 | Zhao et al. | |
| 2014/0127599 A1* | 5/2014 | Kachi | H01M 8/1246 429/434 |
| 2014/0295258 A1* | 10/2014 | Kumar | H01M 50/1535 429/185 |
| 2015/0287961 A1 | 10/2015 | Signorelli et al. | |
| 2019/0067678 A1* | 2/2019 | Tamaki | H01M 4/386 |

FOREIGN PATENT DOCUMENTS

| | | | | |
|---|---|---|---|---|
| CN | 105830247 A | * | 8/2016 | ............ B60L 50/64 |
| CN | 106972122 A | * | 7/2017 | .......... H01M 10/399 |
| CN | 107123781 A | * | 9/2017 | .......... H01M 10/445 |
| CN | 107123782 A | * | 9/2017 | ............ H01M 2/345 |
| CN | 107195855 A | * | 9/2017 | ............. Y02E 60/10 |
| CN | 206585020 U | * | 10/2017 | ............. Y02E 60/10 |
| CN | 107394067 A | * | 11/2017 | ............ H01M 10/38 |
| CN | 107394283 A | * | 11/2017 | ............ H01M 10/38 |
| JP | 08315788 A | | 11/1996 | |
| JP | 08315789 A | | 11/1996 | |
| JP | 08315790 A | | 11/1996 | |
| JP | 3633056 B2 | * | 3/2005 | ........ H01M 10/0431 |

\* cited by examiner

HERMETICALLY SEALED LITHIUM ION CELLS AND A METHOD FOR THEIR MANUFACTURE

FIELD OF INVENTION

The present application relates to hermetically sealed lithium ion cells for various applications including space, and a method for their manufacture. In particular, the present invention provides hermetically sealed lithium ion cells of higher capacity (40-100 Ah) with very high capacity retention capability. It also provides higher capacity lithium ion cells with low internal resistance (<2 mΩ). The cell manufactured by the method can be employed for mission critical applications viz. powering satellites, launch vehicles, aircrafts, military vehicles, submarines and electric vehicles.

BACKGROUND OF INVENTION

Lithium ion cells have gained considerable attention in the past few years as the most popular power source for portable electronics and communication equipments. They are also used as a power source in hybrid electric vehicles and electric vehicles and in high-tech areas like military and space applications. Li-ion cells are characterised by their high voltage, high energy density and low self discharge. A Li-ion cell, like any other electrochemical cell, is made up of three basic components: cathode (or positive electrode), anode (or negative electrode) and electrolyte (which serves as a medium for the movement of ions). Typical cathode materials used in Li-ion cells are $LiCoO_2$, $LiFePO_4$, etc and conventionally used anode materials are graphite/carbon. The cathode/anode active materials along with conducting diluent and binder are coated on aluminium and copper foil respectively, to get the corresponding electrodes. The electrolyte consists of a lithium salt ($LiPF_6$, $LiBF_4$, etc.) dissolved in organic solvents (ethylene carbonate, diethyl carbonate, etc.). Li-ion cells normally use non aqueous electrolytes because lithium is highly reactive in aqueous electrolytes and aqueous electrolyte is not stable at high voltage. The performance of a lithium ion cell strongly depends on the type of materials used and the manufacturing techniques adopted.

Hermetically sealed lithium ion cells with good cycle life are required for critical applications especially for satellites, launch vehicles etc. In order to get higher output power, it is necessary to minimize the internal resistance of the cell. Therefore, specific cell chemistry and design features are essential to meet the high end applications.

The electrochemical performance viz. capacity, rate capability and cycle life of lithium ion cells depends to a large extent on the type of positive and negative active materials and electrolyte employed. $LiCoO_2$ and graphite are the most widely used cathode and anode materials respectively in higher capacity lithium ion cells.

U.S. Pat. No. 5,753,387 describes lithium ion cell with $LiCoO_2$, $LiNiO_2$, $LiMnO_2$, $LiMn_2O_4$ as cathode and carbonaceous anode. EP-A2-0771040 is based on $LiCoO_2$ chemistry. U.S. Pat. No. 6,040,086 refer to a lithium ion cell in which $LiCoO_2$, Lithium nickel composite oxide, spinel type lithium-manganese oxide, vanadium pentoxide or titanium disulfide are used as cathode. US 2009/0068548 A1 describes use of $LiFePO_4$ as cathode active material.

$LiCoO_2$ has limited specific capacity and poor safety features. $LiFePO_4$, even though exhibits good safety features, provides only lesser voltage. $LiNiO_2$ provides high capacity, but the cycle life is limited.

The internal construction of the electrode stack also plays an important role in getting higher current output from the cell. A non aqueous electrolyte secondary cell required for high rate application requires a large number of current-collecting tabs. The electrode stack can be either a stacked one (large numbers of positive and negative electrode are arranged alternatively with separator in between) or a wound one (single piece of lengthy positive and negative electrode wound over a mandrel with separator in between).

US 2012/0177895 A1 discloses a lithium ion cell fabricating method which includes stacking of electrodes having an uncoated portion between portions coated with an electrode active material. The electrodes are arranged in a stack and an overall current collector is connected at the uncoated portion in order to form an electrode booklet. The overall current collector maintains the arrangement of the electrodes and electrically connects all of the uncoated portions of the electrodes. In this particular method and also in stacked configuration, cutting of the electrodes to the required dimension is required which causes shorting problem due to the burrs formed at the edges of the electrodes.

Large wound stacks with lengthy electrodes need multiple current collector tabs for getting good current output from the cell. Several methods are reported in the prior art to take multiple tabs for these types of cells. The tabs can be attached at multiple locations on the electrode. The tabs can be attached either on the bare foil at the edges of the electrodes or on the bare area given throughout the length of the electrode. In both these cases, proper alignment of tabs for subsequent feed through connection is a problem for large wound electrode stacks. Electrode thickness variation with lengthy electrode winding causes poor alignment of the tabs. Poor alignment makes welding of the current tabs to the terminal difficult and induces poor reliability of the cell.

Several types of welding methods are adopted for welding of the electrode stack to the current collecting intermediate tab. JP-A-7-326336 deals with ultrasonic welding of electrode stack. However, when the number of layers increases (i.e. in the case of higher capacity cells), in order to join the layers to the collecting plate, excessive stress is exerted on the joint portions and surrounding areas which can damage the electrodes. Delamination of active material and powdering of collector foil may also happen in ultrasonic welding leading to internal short. Ultrasonic welding also results in high internal resistance in the cell compared to fusion welding like laser welding.

JP-A-2001-38475 proposes to join the collecting leads to the stack integrally by providing projections in the collecting leads and applying ultrasonic vibrations with the projections superposed over the stack. This method also suffers from disadvantages like rupturing of the electrode plate since excessive stress is exerted on the joining portions and surrounding areas.

U.S. Pat. No. 8,025,202 B2 describes a method of welding in which positive electrode substrate exposed portion and negative electrode substrate exposed portion of electrode stack are ultrasonically welded separately to get weld joints. A high energy laser is used to weld the positive electrode substrate exposed portion and negative electrode substrate exposed portion to positive electrode collector and negative electrode collector respectively. In this method also, since ultrasonic welding is involved in the welding of the substrate exposed portions, there is chance for damaging of the foil and generation of metallic particle and delamination of the active material from electrode when the process is adopted for high capacity cells.

Japanese Laid-open Patent applications No. Hei 8-315788, No. Hei 8-315789 and No. Hei 8-315790 disclose a manufacturing method for lithium ion cell in which an open end of a rectangular case is hermetically sealed using a sealing plate by fitting the sealing plate into the open end of the rectangular case which is placed with its opening facing upward, and welding them by applying laser beam in the vertical direction to the part where the rectangular case and the sealing plate are in contact. However, when there is a gap between the portion to be welded, laser can pass through the gap damaging the electrode stack inside the cell case. Also, in case of misplacement of the case and the lid, it can lead to reduced weld strength. When the beam is vertical to the Al joint, it will be reflected back reducing the energy for fusion welding.

In lithium ion cells, the terminals are isolated and insulated by using terminal seals. The commonly used terminals in lithium ion cells are glass to metal and ceramic to metal.

U.S. Pat. No. 6,335,117 B1 discloses an elliptic cylindrical cell with ceramic to metal seal. The positive terminal and negative terminal are brazed to the ceramic material with filler materials. The ceramic material is brazed to the external annular metallic member with the filler materials for brazing. The external annular member is sealed to the opening by welding. U.S. Pat. No. 6,268,079 also deals with hermetically sealed elliptic cylindrical cells with ceramic to metal seals. The ceramic to metal seal used in the present invention is based on diffusion bonding of ceramic to metal and is having three ceramic rings. Diffusion bonded seals with three rings have better corrosion resistance and strength and thus improve the leak tightness of the cell over a period of time.

To sum up, the existing prior arts on cell chemistry and assembly process are having many limitations. With regard to cell chemistry, the prior arts use cathode materials which are leading to limitations in critical features like high specific capacity, sloppy discharge curve and good cycle life. The welding methods adopted in prior art leads to either particle generation/electrode damage or leads to high internal resistance especially when high capacity cells are assembled. The braze joint based ceramic to metal seals described in the prior arts have poor corrosion resistance leading to limited life. All these limitations lead to the development of a new method for manufacturing hermetically sealed higher capacity lithium ion cells for space applications which is devoid of these issues.

OBJECT OF THE INVENTION

The present invention relates to hermetically sealed higher capacity lithium ion cells for various applications including space, and a method for their manufacture:

The primary object of the invention is manufacturing of hermetically sealed lithium ion cells of higher capacity (40-100 Ah) based on Lithiated Nickel Cobalt Aluminium Oxide or Lithiated Nickel Cobalt Manganese Oxide/Graphite chemistry with very high capacity retention for various applications.

Another object of the invention is manufacturing of higher capacity lithium ion cells with low internal resistance (<2 mΩ)) by adopting laser beam welding for stack to intermediate tab and tab to terminal welding.

Still another object of the invention is to provide a lip on the case to avoid laser beam penetration during case to lid welding.

Yet another object of the invention is to use a ceramic to metal seal having three ceramic rings with diffusion bonding with better corrosion resistance for long life.

SUMMARY OF THE INVENTION

Figure 1:
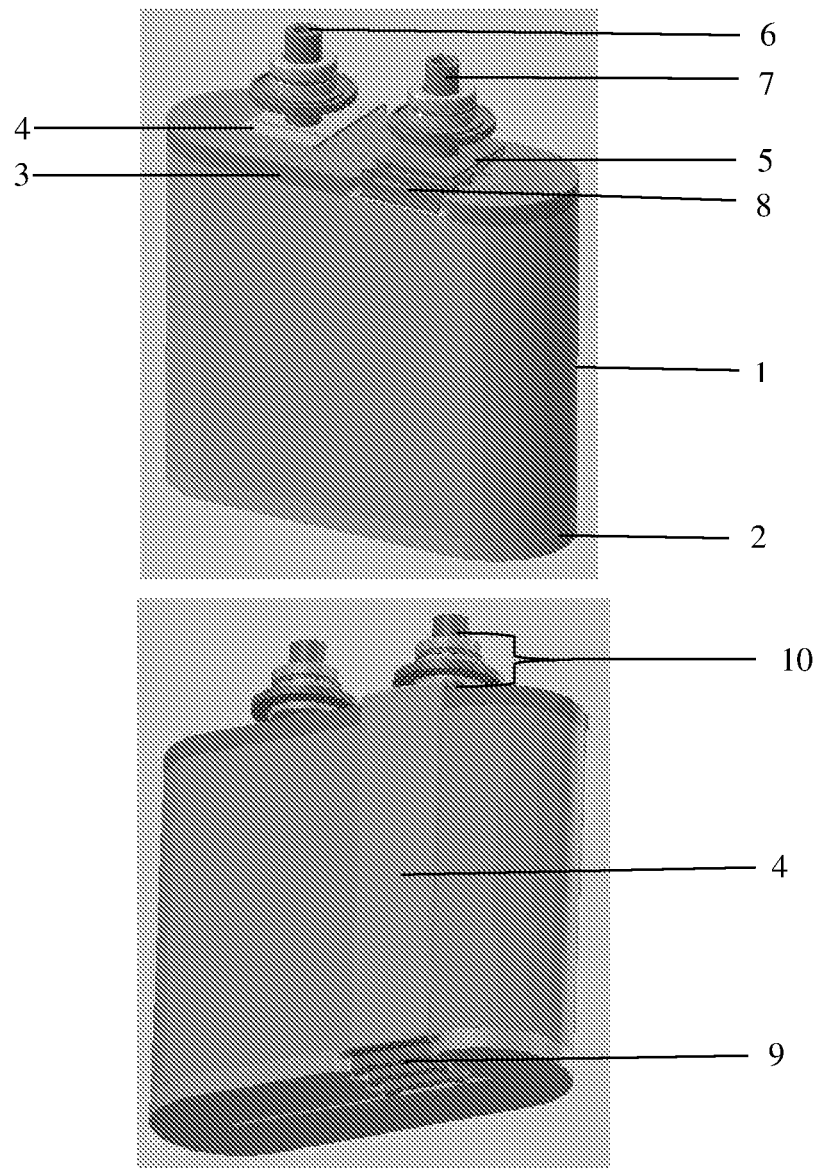
FIG. 1 represents the lithium cell of the present invention. The following are reference numerals corresponding to the specific elements of the cell as denoted in the FIG. 1.
1. Electrode stack,
2. Positive electrode bare foil,
3. Negative electrode bare foil
4. Positive intermediate tab
5. Negative intermediate tab
6. Positive Terminal
7. Negative Terminal
8. Stack to negative tab weld joint
9. Stack to positive tab weld joint
10. Three ring ceramic seal

In one aspect, the present application provides hermetically sealed higher capacity lithium ion cells, wherein the positive electrode is based on Lithiated Nickel Cobalt Aluminium Oxide (NCA) or Lithiated Nickel Cobalt Manganese Oxide (NCM) and negative electrode is based on graphite.

In another aspect the present application provides a process for the manufacture of hermetically sealed lithium ion cells comprising adopting laser beam welding for stack to intermediate tab and tab to terminal welding.

Yet another aspect of the present application provides a process for the manufacture of hermetically sealed lithium ion cells wherein the terminal sealing employed is a ceramic to metal seal having three ceramic rings with diffusion bonding.

Still another aspect of the present invention provides a process for the manufacture of hermetically sealed lithium ion cells comprising the steps of:
a) processing the positive and negative electrodes wherein the positive electrode is based on Lithiated Nickel Cobalt Aluminium Oxide (NCA) or Lithiated Nickel Cobalt Manganese Oxide (NCM) and negative electrode is based on graphite;
b) winding of the electrode stack is carried out in a semi-automatic winding machine using a flat mandrel;
c) welding of stack to intermediate tab and tab to terminal using laser beam welding; and
d) terminal to lid and case to lid welding using laser beam welding.

DETAILED DESCRIPTION OF THE INVENTION

For the purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification are to be understood as being modified in all instances by the term "about". It is noted that, unless otherwise stated, all percentages given in this specification and appended claims refer to percentages by weight of the total composition.

Thus, before describing the present invention in detail, it is to be understood that this invention is not limited to particularly exemplified systems or method parameters that may of course, vary. It is also to be understood that the terminology used herein is for the purpose of describing particular embodiments of the invention only, and is not intended to limit the scope of the invention in any manner.

The use of examples anywhere in this specification including examples of any terms discussed herein is illustrative only, and in no way limits the scope and meaning of the invention or of any exemplified term. Likewise, the invention is not limited to various embodiments given in this specification.

Unless otherwise defined, all technical and scientific terms used herein have the same meaning as commonly understood by one of ordinary skill in the art to which this invention pertains. In the case of conflict, the present document, including definitions will control.

It must be noted that, as used in this specification and the appended claims, the singular forms "a," "an" and "the" include plural referents unless the content clearly dictates otherwise. Thus, for example, reference to a "polymer" may include two or more such polymers.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, the terms "comprising" "including," "having," "containing," "involving," and the like are to be understood to be open-ended, i.e., to mean including but not limited to.

In one aspect, the present application provides hermetically sealed lithium ion cells, wherein the positive electrode is based on Lithiated Nickel Cobalt Aluminium Oxide (NCA) or Lithiated Nickel Cobalt Manganese Oxide (NCM) and negative electrode is based on graphite.

The electrode may further comprise conducting diluents at percentage range of 1-10% and polyvinylidene fluoride at percentage range of 4-10%. The composition of negative electrode is a mixture of graphite at percentage range of 85-96% and polyvinylidene fluoride at percentage range of 3-10%. 1-methyl-2-pyrollidinone (NMP) may be used as solvent.

The final thickness of the electrodes ranges from 140-190 μm and 140-200 μm for positive and negative electrodes respectively. NCA or NCM based electrodes provide high specific capacity and good capacity retention. These materials have sloppy discharge curve which helps in predicting the state of charge of the cell. Other cathode materials (eg. $LiCoO_2$, $LiFePO_4$ etc.) used in the prior art have somewhat flat discharge and lower specific capacity.

In another aspect the present application provides a process for the manufacture of hermetically sealed higher capacity lithium ion cells comprising adopting laser beam welding for stack to intermediate tab and tab to terminal welding.

Welding of positive tab-terminal assembly to stack may be carried out by keeping the electrode stack with intermediate tabs and heat sinks on welding workstation with positive intermediate tab on the top. The LASER (IR) head may be focused over positive intermediate tab-stack interface. Further, the Argon gas nozzle may be focused over positive intermediate tab-stack interface and laser beam may be applied.

Welding of negative tab-terminal assembly to stack may be carried out by keeping the electrode stack with negative intermediate tabs and heat sinks on welding workstation with negative intermediate tab on the top. The LASER (IR/Green) head may be focused over negative intermediate tab-stack interface. Further, the Argon gas nozzle may be focused over negative intermediate tab-stack interface and laser beam may be applied. Laser power may be 5-8" kW". High energy is required for the welding of copper with IR alone due to the high reflectivity and conductivity of copper. Therefore, a combination of IR and Green is used in the present invention. Green laser will be easily absorbed by copper reducing the energy required for welding by IR.

Yet another aspect of the present application provides a process for the manufacture of hermetically sealed lithium ion cells wherein the terminal seal employed is a ceramic to metal seal having three ceramic rings with diffusion bonding. The ceramic to metal seal used in the present invention is based on diffusion bonding of ceramic to metal and is having three ceramic rings. Diffusion bonded seals with three rings have better corrosion resistance and strength and thus improve the leak tightness of the cell over a period of time.

Still another aspect of the present invention provides a process for the manufacture of hermetically sealed lithium ion cells comprising the steps of:
a) processing the positive and negative electrodes wherein the positive electrode is based on Lithiated Nickel Cobalt Aluminium Oxide (NCA) or Lithiated Nickel Cobalt Manganese Oxide (NCM) and negative electrode is based on graphite;
b) winding of the electrode stack in a semi-automatic winding machine using a flat mandrel;
c) welding of stack to intermediate tab and tab to terminal using laser beam welding; and
f) terminal to lid and case to lid welding using laser beam welding.

Processing of the electrodes may be carried out by coating the active material slurry of positive electrode based on Lithiated Nickel Cobalt Aluminium Oxide (NCA) or Lithiated Nickel Cobalt Manganese Oxide (NCM) and negative electrode based on graphite on aluminium foil and copper foil respectively. The composition of positive electrode may be NCA/NCM: 80-90%, conducting diluent: 1-10% and Polyvinylidene fluoride: 4-10%. The composition of negative electrode may be mixed graphite: 85-96% and Polyvinylidene fluoride: 3-10%. 1-methyl-2-pyrollidinone (NMP) may be used as solvent for the processing of the electrode slurry for both positive and negative electrodes. The final thickness of the electrodes may be adjusted to 140-190 μm and 140-200 μm for positive and negative electrodes respectively.

In a specific embodiment, one layer of positive electrode (12-16 m) and one layer of negative electrode (12-16 m) along with separator in between may be wound to form the electrode stack. The separator length may range from 14-17 m and width may range from 6-8 mm more than the negative electrode coating width. The winding may be done in such a way that the uncoated areas of positive electrode and negative electrode project from opposite sides of the stack.

The positive substrate projected width may range from 4-12 mm and negative substrate projected width may range from 4 to 14 mm. Welding of positive intermediate tab to positive terminal involves positioning the positive terminal on the positive intermediate tab and focusing LASER head over the positive terminal-tab interface. Welding may be carried out at a peak power of 4-8 kW.

Welding of negative intermediate tab to negative terminal may be carried out by positioning the negative terminal on the negative intermediate tab and focusing LASER head over the negative terminal-tab interface and welding may be carried out at a peak power of 3-8 kW with IR and green laser with power of 1-2 kW.

Fixing of positive tab-terminal assembly to stack may be carried out by dividing the half portion of aluminium bare of stack into three equal groups.

The grouped aluminium foil may be inserted into the grooves of the positive intermediate tab (with the terminals welded on it). The intermediate tab may be crimped. Fixing of negative tab-terminal assembly to stack may be carried out by dividing the half portion of copper bare of stack into three equal groups.

The grouped copper foil may be inserted into the grooves of the negative intermediate tab (with the terminals welded on it). The intermediate tab may then be crimped. Welding of positive tab-terminal assembly to stack may involve keeping the electrode stack with intermediate tabs and heat sinks on welding workstation with positive intermediate tab on the top. Focusing LASER (IR) head over positive intermediate tab-stack interface. Focusing the Argon gas nozzle over positive intermediate tab-stack interface and laser beam may be applied. Once welding is completed, the stack may be taken out from welding station. Laser power may range from 5-8 kW.

Welding of negative tab-terminal assembly to stack may be carried out by keeping the electrode stack with negative intermediate tabs and heat sinks on welding workstation with negative intermediate tab on the top. LASER (IR/Green) head may be focused over negative intermediate tab-stack interface. The Argon gas nozzle may be focused over negative intermediate tab-stack interface and laser beam may be applied. Once welding is completed, the stack may be taken out from welding station. Laser power may range from 5-8" kW".

Cell case to lid welding may involve inserting the electrode stack with terminal into the cell case with lip such that the terminals face upward. The lid may be placed such that the two terminals project out through the ports in the lid. LASER head and Argon gas nozzle may be focused over positive terminal seal to lid interface and welding may be carried out. The laser power is 5-8 kW for the welding. LASER head and Argon gas nozzle may be focused over negative terminal seal to lid interface and then welding may be carried out.

The case to lid welding may be carried out by focusing laser head and Argon gas nozzle over case to lid interface and carrying out case to lid welding. The laser power for case to lid welding is 5-8 kW at a feed rate of 0.1-1 mm/s in the linear path and 0.5-1.7 mm/s in the radial path.

In a specific embodiment, there is provided a lip on the case to avoid laser beam penetration during case to lid welding.

225-260 g of electrolyte may be added through the fill port provided on the lid. The cell may further be kept for soaking. The cell is formed, gases vented and the fill port may be welded by laser beam welding to achieve hermeticity. The laser power used is 5-9 kW.

The hermetically sealed lithium ion cells of the present invention have a capacity of 40 to 100 Ah with very high capacity retention for various applications, and have low internal resistance of less than 2 mΩ. Helium leak rate achieved is less than $10^{-8}$ mbar L/s. The cell manufactured is subjected to charge-discharge cycles for 1800 cycles at 100% depth-of-discharge. The capacity retention is >80% of the initial capacity.

The cells manufactured by the method can be employed for mission critical applications viz. powering satellites, launch vehicles, aircrafts, military vehicles, submarines and electric vehicles.

The following examples are provided to better illustrate the claimed invention and are not to be interpreted in any way as limiting the scope of the invention. All specific materials, and methods described below, fall within the scope of the invention. These specific compositions, materials, and methods are not intended to limit the invention, but merely to illustrate specific embodiments falling within the scope of the invention. One skilled in the art may develop equivalent materials, and methods without the exercise of inventive capacity and without departing from the scope of the invention. It is the intention of the inventors that such variations are included within the scope of the invention.

EXAMPLES

Manufacture of Hermetically Sealed Lithium Ion Cells
Electrode Processing

The active material slurry of positive electrode based on Lithiated Nickel Cobalt Aluminium Oxide (NCA) or Lithiated Nickel Cobalt Manganese Oxide (NCM) and negative electrode based on graphite is coated on aluminium foil and copper foil respectively. The composition of positive electrode is NCA/NCM: 80-90%, conducting diluent: 1-10% and Polyvinylidene fluoride: 4-10%. The composition of negative electrode is mixed graphite: 85-96% and Polyvinylidene fluoride: 3-10%. 1-methyl-2-pyrollidinone (NMP) was used as solvent for the processing of the electrode slurry for both positive and negative electrodes. The final thickness of the electrodes was adjusted to 140-190 μm and 140-200 μm for positive and negative electrodes respectively.

Electrode Stack Winding

The electrode stack is wound in a semi-automatic winding machine using a flat mandrel. One layer of positive electrode (12-16 m) and one layer of negative electrode (12-16 m) along with separator in between is wound to form the electrode stack. The separator length is kept at 14-17 m and width is kept at 6-8 mm more than the negative electrode coating width. The winding is done in such a way that the uncoated areas of positive electrode and negative electrode project from opposite sides of the stack. The positive substrate projected width is 4 to 12 mm and negative substrate projected width is 4 to 14 mm. The negative electrode extends beyond the length and width of the positive electrode.

Cell Assembly

Assembling the cell in humidity controlled environment with RH<1%. The following are the different steps involved in cell assembly.

Welding of Intermediate Tab to Terminals

The positive terminal is positioned on the positive intermediate tab (aluminium) and LASER head is focused over the positive terminal-tab interface and welding is carried out at a peak power of 4-8 kW. The negative terminal is positioned on the nickel plated negative intermediate tab (copper) and LASER head is focused over the negative terminal-tab interface and welding is carried out at a peak power of 3-8 kW with IR and green laser.

Fixing of Tab-Terminal Assembly to Stack

Half portion of aluminium bare of stack is divided into three equal groups. The grouped foils are inserted into the grooves of the positive intermediate tab (with the terminals welded on it). The positive intermediate tab was crimped. Half portion of copper bare of stack is divided into three equal groups. The grouped foils are inserted into the grooves of the Nickel plated negative intermediate tab (with the terminals welded on it). The negative intermediate tab was crimped.

Welding of Tab-Terminal Assembly to Stack

The electrode stack was kept with intermediate tabs and heat sinks on welding workstation with positive intermediate tab on the top. LASER (IR) head was focused over positive intermediate tab-stack interface. The Argon gas nozzle was focused over positive intermediate tab-stack interface and laser beam was applied. Once welding was completed, the stack was taken out from welding station. The stack was kept in the welding workstation with Nickel plated negative intermediate tab on the top. The LASER (IR/Green) head was focused over negative intermediate tab-stack interface and welding was carried out. Once welding was completed, the stack was taken out from welding station. The laser power was 5-8 kW for both weldings.

Terminal to Lid and Cell Case to Lid Welding

The electrode stack with tab-terminal assembly was inserted into the cell case with a lip such that the terminals face upward. The lid was placed such that the two terminals project out through the ports in the lid. The LASER head and Argon gas nozzle were focused over positive terminal seal to lid interface and welding was carried out. The laser power was 5-8 kW for the welding. Similarly, the LASER head and Argon gas nozzle were focused over negative terminal seal to lid interface and welding was carried out. The LASER head and Argon gas nozzle were focused over case to lid interface and case to lid welding was carried out. The laser power for case to lid welding was 5-8 kW at a feed rate of 0.1-1 mm/s in the linear path and 0.5-1.7 mm/s in the radial path.

225-260 g of electrolyte was added through the fill port provided on the lid. After soaking, the cell was formed, gases were vented and the fill port is welded by laser beam welding to achieve hermeticity. The laser power used was 5-9 kW. The Helium leak rate achieved was less than $10^{-8}$ mbar 1/s.

The cell manufactured in the above manner was subjected to charge-discharge cycles for 1800 cycles at 100% depth-of-discharge. The capacity retention was >80% of the initial capacity.

The invention claimed is:

1. A hermetically sealed lithium ion cell, comprising:
   a positive electrode, wherein the positive electrode is based on Lithiated Nickel Cobalt Aluminum Oxide (NCA) or Lithiated Nickel Cobalt Manganese Oxide (NCM);
   a negative electrode, wherein the negative electrode is based on graphite; and
   a terminal seal, wherein the terminal seal employed is a ceramic to metal seal having three ceramic rings.

2. The hermetically sealed lithium ion cell as claimed in claim 1, wherein a composition of the positive electrode comprises:
   between 80% and 90% Lithiated Nickel Cobalt Aluminum Oxide (NCA); or
   between 80% and 90% Lithiated Nickel Cobalt Manganese Oxide (NCM);
   between 1% and 10% conducting diluent; and
   between 4% and 10% Polyvinylide fluoride.

3. The hermetically sealed lithium ion cell as claimed in claim 1, wherein a composition of the negative electrode comprises:
   between 85% and 96% mixed graphite; and
   between 3% and 10% Polyvinylidene fluoride.

4. The hermetically sealed lithium ion cell as claimed in claim 1, further comprising:
   a case, the case including a lip, wherein the positive electrode and the negative electrode are disposed within the case; and
   a lid, the lid disposed on the case, wherein the lip is configured to avoid laser beam penetration during case to lid welding.

5. A process for manufacture of hermetically sealed lithium ion cells adopting laser beam welding for electrode stack to intermediate tab and intermediate tab to terminal welding for positive and negative electrodes, the process comprising:
   processing the positive and negative electrodes, wherein the positive electrode is based on Lithiated Nickel Cobalt Aluminum Oxide (NCA) or Lithiated Nickel Cobalt Manganese Oxide (NCM) and the negative electrode is based on graphite;
   winding the electrode stack in a winding machine using a flat mandrel;
   welding the electrode stack to positive and negative intermediate tabs and the positive and negative intermediate tabs to respective positive and negative terminals using laser beam welding;
   welding the terminals to a lid and a case to a lid welding using laser beam welding; and
   sealing a terminal using a terminal seal, wherein the terminal seal employed is a ceramic to metal seal having three ceramic rings with diffusion bonding,
   wherein processing the positive and negative electrodes involves coating active material slurry of positive and negative electrodes on aluminum foil and copper foil, respectively,
   wherein welding the negative intermediate tab to the negative terminal involves positioning the negative terminal on the negative intermediate tab and focusing an infrared (IR) and green laser head over a negative terminal-negative intermediate tab interface and carrying out welding at a peak power of between 3 kW and 8 kW.

6. The process as claimed in claim 5, wherein a final thickness of the electrodes is 140-190 μm and 140-200 μm for positive and negative electrodes, respectively.

7. The process as claimed in claim 5, wherein one layer of positive electrode having a length of between 12 m and 16 m and one layer of negative electrode having a length of between 12 m and 16 m along with a separator in between are wound to form the electrode stack,
   wherein the separator has a length between 14 m and 17 m and and a width which is between 6 mm and 8 mm more than the negative electrode coating width,
   wherein the winding is done in such a way that uncoated areas of positive electrode and negative electrode project from opposite sides of the stack.

8. The process as claimed in claim 5, wherein fixing an intermediate tab-terminal assembly to the stack involves fixing a positive intermediate tab-positive terminal assembly to the stack by dividing a half portion of bare aluminum of the stack into three equal groups, and fixing a negative intermediate tab-negative terminal assembly to the stack involves dividing a half portion of bare copper of the stack into three equal groups.

9. The process as claimed in claim 8, wherein the grouped aluminum foil is inserted into grooves of the positive intermediate tab with the terminals welded on it, wherein the positive intermediate tab is crimped.

10. The process as claimed in claim 8, wherein the grouped copper foil is inserted into grooves of the negative intermediate tab with the terminals welded on it, wherein the negative intermediate tab is crimped.

11. The process as claimed in claim 8, wherein welding an intermediate tab-terminal assembly to the stack involves welding the positive intermediate tab-positive terminal assembly to the stack, and welding the negative intermediate tab-negative terminal assembly to the stack.

12. The process as claimed in claim 11, wherein welding the positive intermediate tab-positive terminal assembly to the stack involves keeping the electrode stack with positive intermediate tabs and heat sinks on a welding workstation with the positive intermediate tab on the top, and focusing a laser head over the positive intermediate tab-stack interface and carrying out welding.

13. The process as claimed in claim 11, wherein welding the negative intermediate tab-negative terminal assembly to the stack involves keeping the electrode stack with negative intermediate tabs and heat sinks on a welding workstation with the negative intermediate tab on the top, and focusing an infrared (IR) and green laser head over the negative intermediate tab-stack interface and carrying out welding.

14. The process as claimed in claim 5, wherein terminal to lid welding involves inserting the electrode stack with the intermediate tab-terminal assembly into the case, placing the lid at the top such that the two terminals project out through ports in the lid, focusing the laser head over the lid-terminal interface and carrying out welding.

15. The process as claimed in claim 5, wherein case to lid welding involves focusing the laser head and an Argon gas nozzle over a case to lid interface and carrying out case to lid welding.

* * * * *